(12) United States Patent
Zhang et al.

(10) Patent No.: US 10,317,585 B2
(45) Date of Patent: Jun. 11, 2019

(54) COLOR FILTER SUBSTRATE AND MANUFACTURING METHOD THEREOF, AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Sikai Zhang, Beijing (CN); Min Li, Beijing (CN); Hongjiang Wu, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 44 days.

(21) Appl. No.: 14/315,862

(22) Filed: Jun. 26, 2014

(65) Prior Publication Data

US 2015/0301241 A1    Oct. 22, 2015

(30) Foreign Application Priority Data

Apr. 18, 2014  (CN) .......................... 2014 1 0158130

(51) Int. Cl.
   *G02B 5/20*    (2006.01)
(52) U.S. Cl.
   CPC .................... *G02B 5/201* (2013.01)
(58) Field of Classification Search
   CPC ....... G02B 5/20; G02B 5/201; G02F 1/33514; G02F 1/33512
   USPC .......................... 359/891; 349/106, 107–110
   See application file for complete search history.

(56) References Cited

U.S. PATENT DOCUMENTS

| 7,474,483 | B2* | 1/2009 | Cheng ..................... G02B 5/201 349/106 |
| 2013/0295274 | A1* | 11/2013 | Lee ................... G02F 1/133345 427/58 |
| 2014/0036189 | A1* | 2/2014 | Yi ...................... G02F 1/133512 349/43 |
| 2014/0168045 | A1* | 6/2014 | Jiang ................. G02F 1/136286 345/92 |

* cited by examiner

*Primary Examiner* — Darryl J Collins
*Assistant Examiner* — Journey F Sumlar
(74) *Attorney, Agent, or Firm* — Nath, Goldberg & Meyer; Joshua B. Goldberg

(57) ABSTRACT

Embodiments of the invention provide a color film substrate and a manufacturing method thereof, and a display device, which are used in the field of display technology, and can improve the product quality, reduce costs, and improve production capacity. The color film substrate includes a plurality of first and second black matrixes which are arranged to intersect, and a color filter structure; wherein, the color filter structure includes at least first, second and third color filters, each of the first, second and third color filters includes a first and a second openings, area of a first region between a second opening of the first color filter and a first opening of the second color filter is not the same as that of a second region between a second opening of the second color filter and a first opening of the third color filter.

18 Claims, 6 Drawing Sheets

COLOR FILTER SUBSTRATE AND MANUFACTURING METHOD THEREOF, AND DISPLAY DEVICE

TECHNICAL FIELD

The present invention relates to the field of display technology, and in particular, to a color filter substrate and a manufacturing method thereof, and a display device.

BACKGROUND ART

Currently, post spacers (PS in abbreviation) on a color filter substrate are generally classified into two categories, a main post spacer (Main PS) functioning as a main support and a sub post spacer (Sub PS) functioning as an auxiliary support, and the Main PS and the Sub PS are required to have a certain height difference therebetween.

In the prior art, in order to achieve the certain height difference between the Main PS and the Sub PS, the Main PS is generally provided on the color filter substrate so that it can directly contacts a TFT on an array substrate after the color filter substrate and the array substrate are aligned and assembled, and the Sub PS is provided in a region where a color filter on the color filter substrate and a black matrix overlap, so that a height difference occurs between the Main PS and the Sub PS. However, when the Main PS directly contacts the TFT, poor contact of the TFT is readily caused and the Sub PS is apt to tilt, which will affect the product quality. Alternatively, in a patterning process for manufacturing the post spacers, a gray tone mask plate or a halftone mask plate is used for exposing a post spacer layer, wherein the Sub PS corresponds to a light semi-transmissive region of the gray tone mask plate or the halftone mask plate, the Main PS corresponds to a light transmissive region of the gray tone mask plate or the halftone mask plate, and the remaining parts correspond to light non-transmissive regions of the gray tone mask plate or the halftone mask plate, and then the post spacer layer are developed to obtain the Main PS and the Sub PS. Through the above patterning process, the height difference between the Main PS and the Sub PS can be obtained. However, the patterning process using the gray tone mask plate or the halftone mask plate is high in cost and it is difficult to meet requirements on cost savings and improved production capacity.

SUMMARY

Embodiments of the present invention provide a color filter substrate and a manufacturing method thereof, and a display device, which can improve the product quality, reduce costs, and improve production capacity.

In order to achieve the above object, embodiments of the present invention adopt the following technical solutions:

In one aspect, a color filter substrate is provided to include a plurality of first black matrixes and a plurality of second black matrixes which are arranged to intersect, and a color filter structure arranged along the direction of the second black matrix; wherein the color filter structure includes at least a plurality of first color filters, a plurality of second color filters, and a plurality of third color filters, every two adjacent color filters are separated from each other by one second black matrix, the plurality of first color filters, the plurality of second color filters, and the plurality of third color filters are arranged sequentially in a color filter cycle, the color filter cycle includes one first color filter, one second color filter and one third color filter;

each color filter among at least three adjacent color filters includes a first opening and a second opening at overlapping region with one first black matrix, and an opening direction of the first opening is opposite to an opening direction of the second opening;

a region between the second opening of the first color filter and the first opening of the second color filter opposite to the second opening of the first color filter is defined as a first region, a region between the second opening of the second color filter and the first opening of the third color filter opposite to the second opening of the second color filter is defined as a second region, and area of the first region is not the same as that of the second region;

the color filter substrate further includes a planarization layer, first post spacers and second post spacers, the planarization layer is located above the plurality of first black matrixes, the plurality of second black matrixes and the color filter structure, and thickness of the planarization layer at the first region is not the same as that at the second region; and the first post spacer is located on the planarization layer at the first region, the second post spacer is located on the planarization layer at the second region and the first post spacer and the second post spacer are identical in shape and in size.

Optionally, each color filter includes a first opening and a second opening at overlapping region with one first black matrix.

Optionally, the plurality of first black matrixes and the plurality of second black matrixes are arranged perpendicular to each other, the plurality of first black matrixes correspond to gate lines of an array substrate, and the plurality of second black matrixes correspond to data lines of the array substrate.

Optionally, the first opening is triangular, semi-circular, semi-elliptical, or semi-polygonal in shape; and the second opening is triangular, semi-circular, semi-elliptical, or semi-polygonal in shape.

Optionally, the first opening is of a first isosceles triangle, and a bottom of the first isosceles triangle coincides with a first side of the color filter which the first opening belongs to; and the second opening is of a second isosceles triangle, and a bottom of the second isosceles triangle coincides with a second side of the color filter which the second opening belongs to.

Optionally, each of the first post spacer and the second post spacer is of a frustum of cone, area of a lower bottom of the first post spacer which contacts the planarization layer is larger than area of an upper bottom of the first post spacer which is far away from the planarization layer, and area of a lower bottom of the second post spacer which contacts the planarization layer is larger than area of an upper bottom of the second post spacer which is far away from the planarization layer.

In one aspect, a display device is provided to include any color filter substrate mentioned above.

In one aspect, a manufacturing method of a color filter substrate is provided to include steps:

forming a plurality of first black matrix patterns and a plurality of second black matrix patterns which are arranged to intersect on a transparent substrate through a single patterning process;

forming a color filter layer pattern on the transparent substrate formed with the plurality of first black matrix patterns and the plurality of second black matrix patterns thereon;

wherein the color filter layer pattern includes at least a plurality of first color filter patterns, a plurality of second color filter patterns, and a plurality of third color filter patterns, every two adjacent color filter patterns are separated from each other by one second black matrix pattern, the plurality of first color filter patterns, the plurality of second color filter patterns, and the plurality of third color filter patterns are arranged sequentially in a color filter pattern cycle, the color filter pattern cycle includes one first color filter pattern, one second color filter pattern and one third color filter pattern, each color filter pattern among at least three adjacent color filter patterns includes a first opening and a second opening at overlapping region with one first black matrix pattern, and an opening direction of the first opening is opposite to an opening direction of the second opening; a region between the second opening of the first color filter pattern and the first opening of the second color filter pattern opposite to the second opening of the first color filter pattern is defined as a first region, a region between the second opening of the second color filter pattern and the first opening of the third color filter pattern opposite to the second opening of the second color filter pattern is defined as a second region, and area of the first region is not the same as that of the second region;

forming a planarization layer on the transparent substrate formed with the plurality of first black matrix patterns, the plurality of second black matrix patterns and the color filter layer pattern thereon, so that thickness of the planarization layer at the first region is not the same as that at the second region; and forming a post spacer layer pattern including a first post spacer pattern and a second post spacer on the planarization layer through a single patterning process so that the first post spacer and the second post spacer are identical in both shape and size.

Optionally, each color filter pattern includes a first opening and a second opening at overlapping region with one first black matrix.

Optionally, the step of forming a plurality of first black matrix patterns and a plurality of second black matrix patterns which are arranged to intersect on a transparent substrate through a single patterning process includes:

forming a plurality of first black matrix patterns and a plurality of second black matrix patterns which are arranged perpendicular to each other on a transparent substrate through a single patterning process, wherein the plurality of first black matrix patterns correspond to gate lines of an array substrate, and the plurality of second black matrix patterns correspond to data lines of the array substrate.

Optionally, the step of forming a color filter layer pattern on the transparent substrate formed with the plurality of first black matrix patterns and the plurality of second black matrix patterns thereon includes:

forming a layer of first filter material on the transparent substrate formed with the plurality of first black matrix patterns and the plurality of second black matrix patterns thereon, performing exposure on the layer of first filter material using a first mask plate and then performing development on it to form the first color filter pattern including the first opening and the second opening;

forming a layer of second filter material on the transparent substrate formed with the first color filter pattern thereon, performing exposure on the layer of second filter material using a second mask plate and then performing development on it to form the second color filter pattern including the first opening and the second opening; and forming a layer of third filter material on the transparent substrate formed with the second color filter pattern thereon, performing exposure on the layer of third filter material using a third mask plate exposure, and then performing development on it to form the third color filter pattern including the first opening and the second opening.

Optionally, the step of forming a post spacer layer pattern including a first post spacer pattern and a second post spacer on the planarization layer through a single patterning process includes:

forming a post spacer layer on the planarization layer, performing exposure on the post spacer layer using a full tone mask plate, and then performing development on it to form the post spacer layer pattern including the first post spacer pattern and the second post spacer pattern.

Embodiments of the present invention provide a color filter substrate and a manufacturing method thereof, and a display device, wherein the color filter substrate includes at least a plurality of first color filters, a plurality of second color filters, a plurality of third color filters, and each color filter among at least three adjacent color filters (i.e. at least a set of a first color filter, a second color filter and a third color filter which are arranged adjacently) is provided with a first opening and a second opening, so that areas of the first region and the second region defined by the first color filter, the second color filter and the third color filter provided with the first openings and the second openings are not identical, and thickness of the planarization layer at the first region is not the same as that of the planarization layer at the second region, thus when the first post spacer and the second post spacer are respectively disposed at the first region and the second region and the first post spacer and the second post spacer are identical in both size and shape, the height difference between the first post spacer and the second post spacer is readily achieved by difference between thickness of the planarization layer at the first region and that of the planarization layer at the second region. Compared with the prior art, the procedure of patterning processes is simplified.

BRIEF DESCRIPTION OF THE DRAWINGS

In order to illustrate more clearly the technical solutions of the present invention or in the prior art, drawings required when describing the embodiments or the prior art will be briefly introduced in the following, and obviously, drawings in the following are just used to illustrate some embodiments of the present invention and persons skilled in the art may obtain other drawings based on these drawings without any creative efforts.

DESCRIPTION OF REFERENCE SIGNS

Figure 1A:
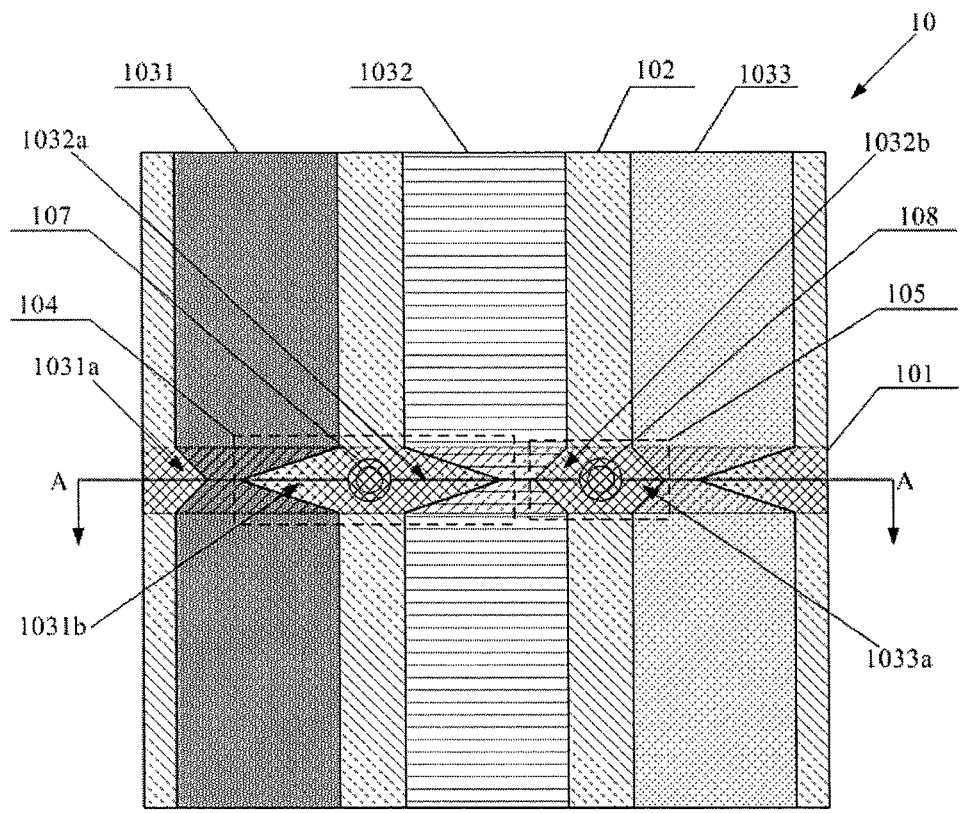
FIG. 1(a) is a schematic view of a structure of a color filter substrate according to an embodiment of the present invention.

10: color filter substrate; 101: first black matrix; 102: second black matrix; 1031: first color filter; 1032: second color filter; 1033: third color filter; 104: first region; 105: second region; 106: planarization layer; 107: first post spacer; 108: second post spacer; 1071: lower bottom of first post spacer; 1072: upper bottom of first post spacer.

DETAILED DESCRIPTION OF THE PREFERRED EMBODIMENTS

In the following, technical solutions of embodiments of the present invention will be described clearly and completely in conjunction with drawings of embodiments of the present invention. Obviously, the embodiments to be described are just part of embodiments of the present invention and not all the embodiments. All other embodiments, obtained by persons skilled in the art based on the embodiments described in the present invention without any creative effort, should fall within the protection scope of the present invention.

An embodiment of the present invention provides a color filter substrate 10, which includes a plurality of first black matrixes 101 and a plurality of second black matrixes 102 which are arranged to intersect, and a color filter structure arranged along the second black matrix 102.

The color filter structure includes at least first color filters 1031, second color filters 1032 and third color filters 1033, the first color filters 1031, the second color filters 1032 and the third color filters 1033 are separated from each other by the second black matrixes 102, and the first color filters 1031, the second color filters 1032 and the third color filters 1033 are arranged cyclically.

Each of the first color filter 1031, the second color filter 1032 and the third color filter 1033 includes a first opening and a second opening at overlapping regions with the first black matrix 101 and an opening direction of the first opening is opposite to that of the second opening.

A region between the second opening 1031b of the first color filter 1031 and the first opening 1032a of the second color filter 1032 opposite to the second opening 1031b of the first color filter 1031 is defined as a first region 104, a region between the second opening 1032b of the second color filter 1032 and the first opening 1033a of the third color filter 1033 opposite to the second opening 1032b of the second color filter 1032 is defined as a second region 105, and area of the first region 104 is not the same as that of the second region 105.

The color filter substrate 10 further includes a planarization layer 106, a first post spacer 107 and a second post spacer 108, the planarization layer 106 is located above the first black matrixes and the second black matrixes as well as the color filter structure, and thickness of the planarization layer at the first region 104 is not the same as that of the planarization layer at the second region 105; the first post spacer 107 is located on the planarization layer at the first region 104, the second post spacer 108 is located on the planarization layer at the second region 105 and the first post spacer 107 and the second post spacer 108 are identical in shape and in size.

Thus, since each of the first color filter, the second color filter and the third color filter includes the first opening and the second opening, areas of the first region and the second region formed by the first color filter, the second color filter and the third color filter are not identical, and thickness of the planarization layer at the first region is not the same as that of the planarization layer at the second region, thus when the first post spacer and the second post spacer are identical in both size and shape, the height difference between the first post spacer and the second post spacer is readily achieved by difference between thickness of the planarization layer at the first region and that of the planarization layer at the second region. Compared with the prior art, the procedure of patterning processes is simplified, the product quality is improved, cost is reduced and the production capacity is improved.

It should be pointed out that, first, the color filter substrate 10 includes the plurality of first black matrixes 101 and the plurality of second black matrixes 102 which are arranged to intersect. Alternatively, the first black matrixes 101 and the second black matrixes 102 may be arranged perpendicular to each other, or may be arranged to intersect at a certain angle, so that the sub-pixel units formed by the color filter substrate 10 may be of rectangular, square, rhombic, or polygonal. For example, the first black matrixes 101 and the second black matrixes 102 are arranged perpendicular to each other, the first black matrixes 101 may be black matrixes for gate lines on the color filter substrate 10, and after the color filter substrate 10 and the array substrate are aligned and assembled, the black matrixes for gate lines correspond to gate lines on the array substrate. The second black matrixes 102 may be black matrixes for data lines on the color filter substrate 10, and after the color filter substrate 10 and the array substrate are aligned and assembled, the black matrixes for data lines correspond to data lines on the array substrate. The embodiment of the present invention is described using an example in which the first black matrixes are arranged horizontally and the second black matrixes are arranged vertically when the display panel including the color filter substrate 10 operates normally. However, in the present invention, which of the first black matrixes 101 and the second black matrixes 102 corresponding to which of the data lines and the gate lines is not limited.

Second, the color filter structure includes at least the first color filters 1031, the second color filters 1032 and the third color filters 1033; the first color filter 1031, the second color filter 1032 or the third color filter 1033 may be any one of a red color filter, a green color filter and a blue color filter, and the correspondence between the first color filter 1031, the second color filter 1032, the third color filter 1033 and the red color filter, the green color filter, the blue color filter is not limited. In an actual application, the color filter structure may further include a fourth color filter which may be a yellow color filter or other color filter, which is not limited in the present invention.

Third, the first color filter 1031, the second color filter 1032 and the third color filter 1033 are arranged cyclically, that is, the color filters in the color filter substrate are arranged sequentially in a color filter cycle, and for example, the color filter cycle includes one first color filter 1031, one second color filter 1032 and one third color filter 1033.

The embodiment of the present invention provides the color filter 10 as shown in FIG. 1(a) which includes the plurality of first black matrixes 101 and the plurality of second black matrixes 102 which are arranged to intersect, and the color filter structure arranged along direction of the second black matrix 102. The color filter structure includes at least the first color filters 1031, the second color filters 1032 and the third color filters 1033 which are separated from each other by the second black matrixes 102, and the first color filters 1031, the second color filters 1032 and the third color filters 1033 are arranged cyclically. For example, the plurality of first black matrixes 101 and the plurality of second black matrixes 102 may be arranged perpendicular to each other, wherein the first black matrixes 101 may be black matrixes for gate lines on the color filter substrate 10 and the second black matrixes 102 may be black matrixes for data lines on the color filter substrate 10. The embodiment of the present invention is described with the example in which the color filter structure includes the first color filters 1031, the second color filters 1032 and the third color filters 1033 which are arranged cyclically.

Figure 2A:
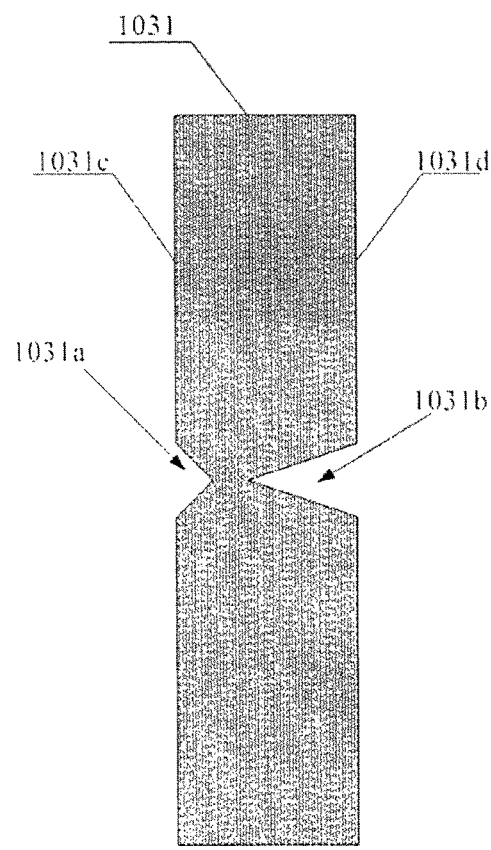
FIG. 2(a) is a schematic view of a structure of a first color filter shown in FIG. 1(a) according to the embodiment of the present invention.
Figure 2B:
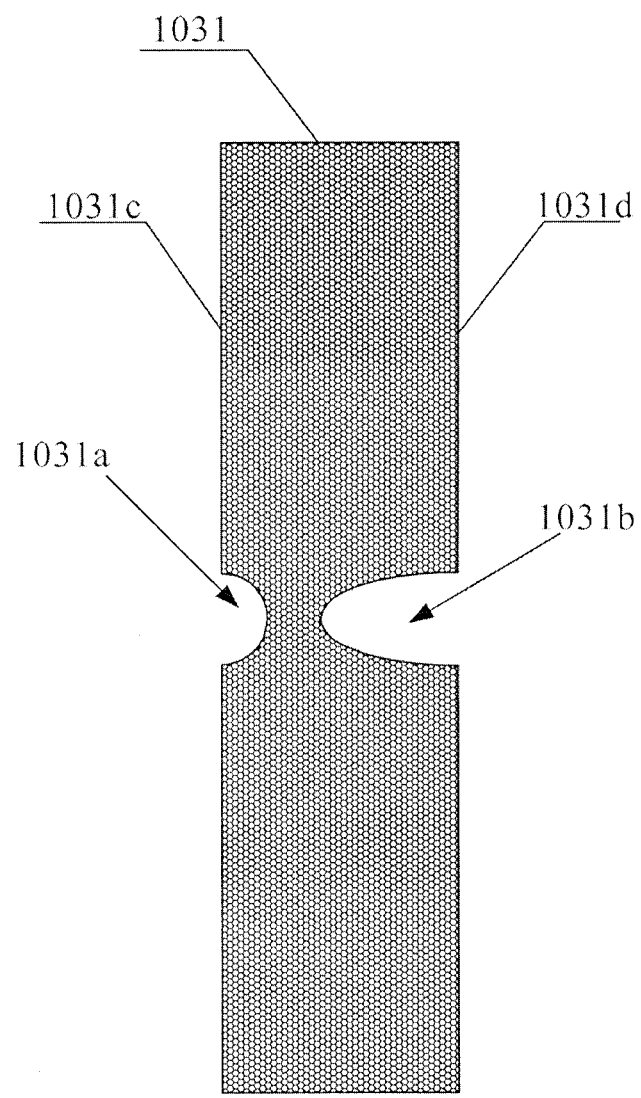
FIG. 2(b) is a schematic view of a structure of a second color filter according to another embodiment of the present invention.
Figure 2C:
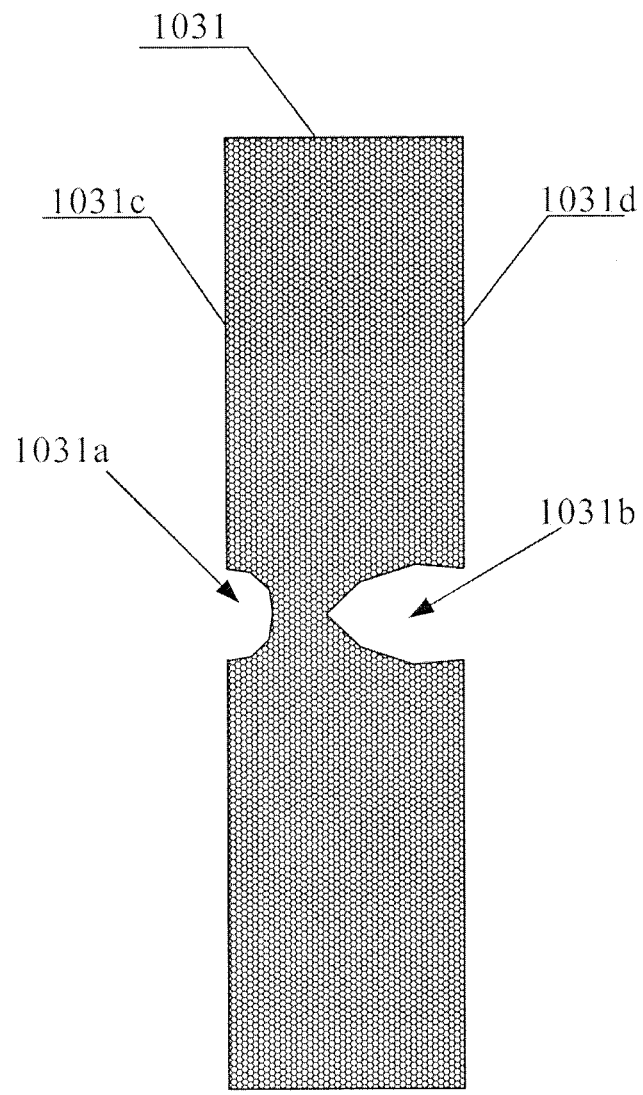
FIG. 2(c) is a schematic view of a structure of a third color filter according to another embodiment of the present invention.

Each of the first color filter 1031, the second color filter 1032 and the third color filter 1033 include the first opening and the second opening at the overlapping regions with the first black matrix 101, and the opening direction of the first opening is opposite to that of the second opening, as shown in FIGS. 2(a)-2(c). Taking the first color filter 1031 as an example, the first color filter 1031 includes the first opening 1031a and the second opening 1031b. A region between the second opening 1031b of the first color filter 1031 and the first opening 1032b of the second color filter 1032 opposite to the second opening 1031b of the first color filter 1031 is defined as a first region 104, as shown by the region 104 in FIG. 1(a), and a region between the second opening 1032b of the second color filter 1032 and the first opening 1033a of the third color filter 1033 opposite to the second opening 1032b of the second color filter 1032 is defined as a second region 105, as shown by the region 105 in FIG. 1(a), and area of the first region 104 is not the same as that of the second region 105.

Figure 1B:
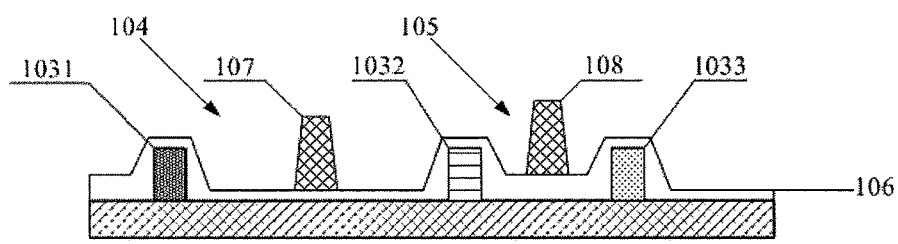
FIG. 1(b) is a cross-sectional view of the color filter substrate according to the embodiment of the present invention.

As shown in FIG. 1(b) which is a cross-sectional view of the color filter substrate 10 taken along Line A-A in FIG. 1(a), the color filter substrate 10 further includes the planarization layer 106, the first post spacer 107 and the second post spacer 108, the planarization layer 106 is arranged above the first and second black matrixes and the color filter structure, the first post spacer 107 is located on the planarization layer 106 at the first region 104, the second post spacer 108 is located on the planarization layer 106 at the second region 105, and the first post spacer 107 and the second post spacer are identical in both shape and size. Thickness of the planarization layer at the first region 104 is not the same as that of the planarization layer at the second region 105, and thus the height difference between the first post spacer 107 and the second post spacer 108 is readily achieved by difference between thickness of the planarization layer at the first region 104 and that of the planarization layer at the second region 105.

Figure 3:
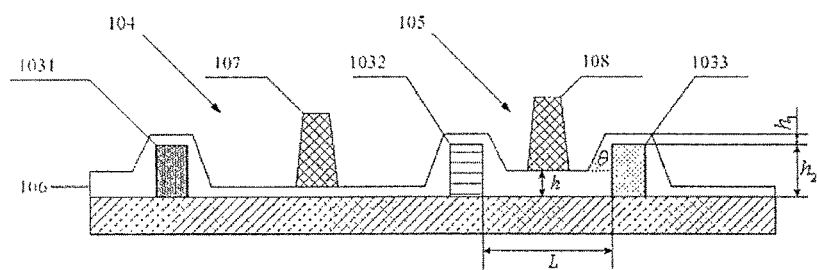
FIG. 3 is a cross-sectional view of the first color filter labeled with dimensions according to the embodiment of the present invention.

In particular, as shown in FIG. 3, assuming that distance between the second color filter 1032 and the third color filter 1033 at the second region 105 is L, thickness of the planarization layer on the third color filter 1033 or the second color filter 1032 is h1, thicknesses of both the second color filter 1032 and the third color filter 1033 are h2, and an angle between the inclined plane and the horizontal plane of the planarization layer at the second region 105 is θ, since no matter whether each of the first color filter 1031, the second color filter 1032 and the third color filter 1033 includes the first opening and the second opening or not, amount of material of the planarization layer at the second region 105 is constant, so the following equation (1) may be obtained:

$$h_1 \times L = h \times L + \frac{(h_1 + h_2 - h)^2}{\tan\theta}; \qquad (1)$$

The following equation (2) may be obtained by calculating derivatives of both sides of the equation (1):

$$\frac{dh}{dL} = \frac{h_1 - h}{L - \frac{2(h_1 + h_2 - h)}{\tan\theta}}; \qquad (2)$$

It ca be seen from the equation (2), when L is changed, h will be changed accordingly. For example, when L becomes large, h becomes small proportionally, and when L becomes small, h becomes large proportionally, so various h may be obtained by adjusting L. Thus, when the first post spacer and the second post spacer are located at positions with different h on the planarization layer, a height difference between the first post spacer and the second post spacer is obtained. From the above, the present invention may achieve the height difference between the first post spacer and the second post spacer through a general process without using complex processes such as half exposure process, so production cost is saved.

Further, the first opening may be triangular, semi-circular, semi-elliptical, or semi-polygonal in shape, and the second opening may be triangular, semi-circular, semi-elliptical, or semi-polygonal in shape, which are not limited in the present invention.

Preferably, the first opening is of a first isosceles triangle, and a bottom of the first isosceles triangle coincides with a first side of the color filter the first opening belongs to; the second opening is of a second isosceles triangle, and a bottom of the second isosceles triangle coincides with a second side of the color filter the second opening belongs to. Referring to FIGS. 2(a)-2(c), taking the first color filter 1031 as an example, the first opening 1031a of the first color filter 1031 is of the first isosceles triangle and the bottom of the first isosceles triangle coincides with the first side 1031c of the first color filter 1031, and the second opening 1031b of the first color filter 1031 is of the second isosceles triangle and the bottom of the second isosceles triangle coincides with the second side 1031d of the first color filter 1031, so that the region formed by the second opening 1031b of the first color filter 1031 and the first opening 1032a of the second color filter 1032 is ensured to be flat.

Figure 4A:
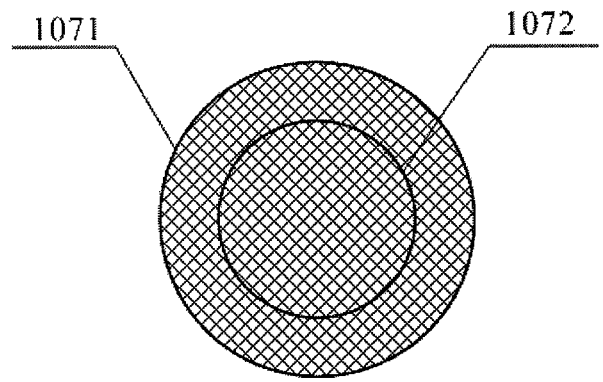
FIG. 4(a) is a top view of a first post spacer shown FIGS. 1(a) and 1(b) according to the embodiment of the present invention.
Figure 4B:
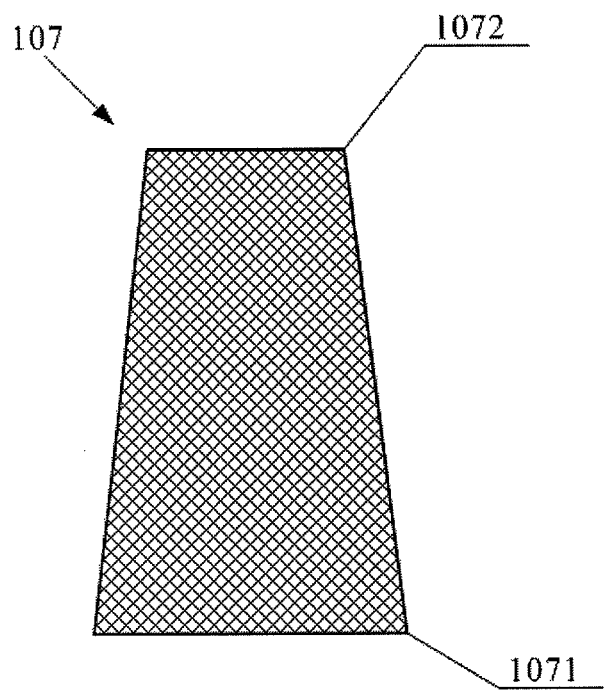
FIG. 4(b) is a side view of the first post spacer shown FIGS. 1(a) and 1(b) according to the embodiment of the present invention.

Preferably, the color filter substrate of the present invention will be described by taking an example in which each of the first post spacer 107 and the second post spacer 108 is of a frustum of cone. As shown in FIGS. 4(a) and 4(b) (FIG. 4(a) is a top view of the structure in FIG. 4(b)), area of the lower bottom 1071 of the first post spacer 107 which contacts the planarization layer 106 is larger than that of the upper bottom 1072 of the first post spacer 107 which is far away from the planarization layer 106, and similarly, area of the lower bottom of the second post spacer 108 which contacts the planarization layer 106 is larger than that of the upper bottom of the second post spacer 108 which is far away from the planarization layer 106. It should be pointed out that, the first post spacer and the second post spacer may be of cylinders or of other shapes; the first post spacer and the second post spacer are described in the present invention by taking the frustum of cone as an example, shapes of the first and second post spacers are not limited in the present invention and the shapes of the first and second post spacers may be identical or not.

The color filter substrate provided by embodiments of the present invention includes at least the first color filters, the second color filters, and the third color filters, and each color filter of the first, second and third color filters is provided with the first opening and the second opening so that areas of the first region and the second region defined by the first, second and third color filters are not identical, and thickness of the planarization layer at the first region is not the same as that of the planarization layer at the second region, thus when the first and second post spacers respectively disposed at the first and second regions are identical in both size and shape, the height difference between the first post spacer and the second post spacer is readily achieved by difference between thickness of the planarization layer at the first region and that of the planarization layer at the second region. Compared with the prior art, the product quality is improved, cost is reduced, and production capacity is improved.

It should be pointed out that, in order to simplify the procedure of processes and improve the product quality, each color filter on the color filter substrate includes a first opening and a second opening at overlapping region with one first black matrix. It should be appreciated that, color filters located at the edge of the color filter substrate or one or some color filters (which may refer to the first color filter, the second color filter or the third color filter) on the color filter substrate may not include both the first opening and the second opening, or not include the first opening or the second opening, as long as the display effect is not influenced.

Embodiments of the present invention provide a display device which includes the color filter substrate 10.

In particular, the color filter substrate 10 includes a plurality of first black matrixes 101 and a plurality of second black matrixes 102 which are arranged to intersect, and a color filter structure arranged along the second black matrix 102. The color filter structure includes at least first color filters 1031, second color filters 1032 and third color filters 1033, the first color filters 1031, the second color filters 1032 and the third color filters 1033 are separated from each other by the second black matrixes 102, and the first color filters 1031, the second color filters 1032 and the third color filters 1033 are arranged cyclically. Each of the first color filter 1031, the second color filter 1032 and the third color filter 1033 includes a first opening and a second opening at overlapping region with the first black matrix 101 and an opening direction of the first opening is opposite to that of the second opening. A region between the second opening 1031*b* of the first color filter 1031 and the first opening 1032*a* of the second color filter 1032 opposite to the second opening 1031*b* of the first color filter 1031 is defined as a first region 104, a region between the second opening 1032*b* of the second color filter 1032 and the first opening 1033*a* of the third color filter 1033 opposite to the second opening 1032*b* of the second color filter 1032 is defined as a second region 105, and area of the first region 104 is not the same as that of the second region 105.

The color filter substrate 10 further includes a planarization layer 106, first post spacers 107 and second post spacers 108, the planarization layer 106 is located above the first black matrixes and the second black matrixes as well as the color filter structure, the first post spacer 107 is located on the planarization layer at the first region 104, the second post spacer 108 is located on the planarization layer at the second region 105, and the first post spacer 107 and the second post spacer 108 are identical in both shape and size. Wherein, thickness of the planarization layer at the first region 104 is not the same as that of the planarization layer at the second region 105;

The present invention provides a display device which includes a color filter substrate and the color filter substrate includes at least first color filters, second color filters and third color filters and each of the first, second and third color filters includes the first opening and the second opening, areas of the first region and the second region formed by the first color filter, the second color filter and the third color filter are not identical, and thickness of the planarization layer at the first region is not the same as that of the planarization layer at the second region, thus when the first post spacer and the second post spacer are identical in both size and shape, the height difference between the first post spacer and the second post spacer is readily achieved by difference between thickness of the planarization layer at the first region and that of the planarization layer at the second region. Compared with the prior art, the product quality is improved, cost is reduced and the production capacity is improved.

Figure 5:
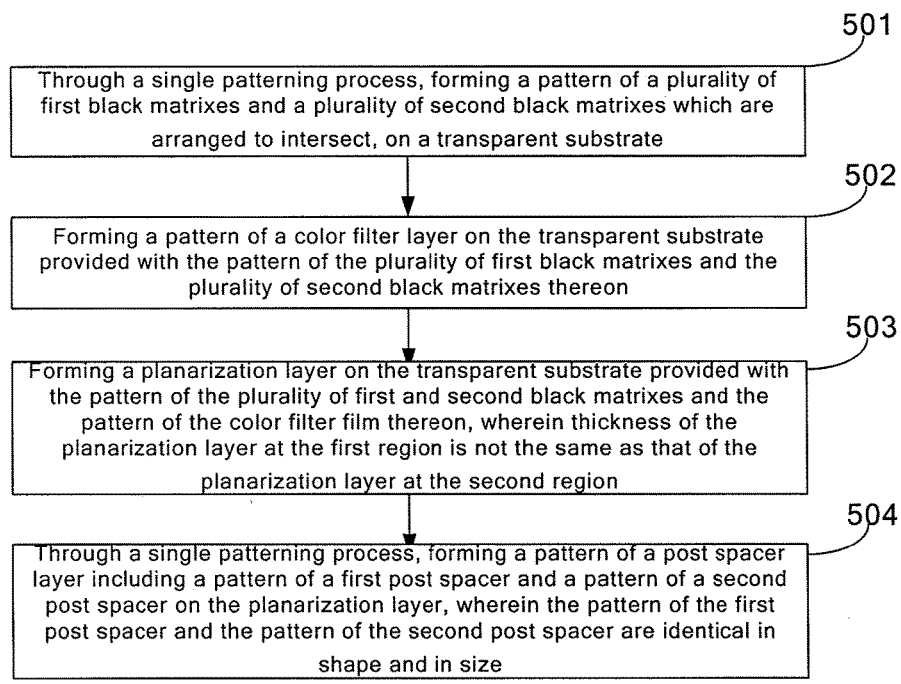
FIG. 5 is a flow chart of a manufacturing method of a color filter substrate according to an embodiment of the present invention.

Embodiments of the present invention provide a manufacturing method of the color filter 10, and as shown in FIG. 5, the manufacturing method includes:

Step 501, forming a plurality of first black matrix patterns and a plurality of second black matrix patterns which are arranged to intersect on a transparent substrate through a single patterning process.

In particular, a black film is first deposited on the transparent substrate, and then is exposed using a general mask plate, and further is developed to form a plurality of first black matrix patterns and a plurality of second black matrix patterns which are arranged to intersect. Wherein, the general mask plate consists of a light transmissive region and a light non-transmissive region, and both the first black matrixes and the second black matrixes correspond to the light transmissive region of the general mask plate.

Alternatively, the step of forming a plurality of first black matrix patterns and a plurality of second black matrix patterns which are arranged to intersect on a transparent substrate through a single patterning process includes: forming a plurality of first black matrix patterns and a plurality of second black matrix patterns which are arranged perpendicular to each other on a transparent substrate through a single patterning process, wherein the plurality of first black matrix patterns correspond to gate lines of an array substrate, and the plurality of second black matrix patterns correspond to data lines of the array substrate.

Step 502, forming a color filter layer pattern on the transparent substrate formed with the plurality of first black matrix patterns and the plurality of second black matrix patterns thereon.

The color filter layer pattern includes at least a plurality of first color filter patterns, a plurality of second color filter patterns, and a plurality of third color filter patterns, every two adjacent color filter patterns are separated from each other by one second black matrix pattern, the plurality of first, second and third color filter patterns are arranged sequentially in a color filter pattern cycle, the color filter pattern cycle includes one first color filter pattern, one second color filter pattern and one third color filter pattern, each color filter pattern among at least three adjacent color filter patterns (at least a set of a first color filter, a second color filter and a third color filter which are arranged adjacently) includes a first opening and a second opening at overlapping region with one first black matrix pattern, and an opening direction of the first opening is opposite to an opening direction of the second opening; a region between the second opening of the first color filter pattern and the first opening of the second color filter pattern opposite to the second opening of the first color filter pattern is defined as a first region 104, a region between the second opening of the second color filter pattern and the first opening of the third color filter pattern opposite to the second opening of the second color filter pattern is defined as a second region 105, and area of the first region 104 is not the same as that of the second region 105.

In particular, if the color filter layer pattern is intended to include a plurality of first color filter patterns, a plurality of second color filter patterns and a plurality of third color filter patterns, layers of filter materials are formed on the transparent substrate formed with the plurality of first black matrix patterns and the plurality of second black matrix patterns thereon, for example by spin coating, scraping, or other methods, which is not limited in the present invention. For example, the step of forming a color filter layer pattern on the transparent substrate formed with the plurality of first black matrix patterns and the plurality of second black matrix patterns thereon includes: forming a layer of first filter material on the transparent substrate formed with the plurality of first and second black matrix patterns thereon by spin coating or scraping; performing exposure on the layer of first filter material using a first mask plate, wherein a region on the first mask plate corresponding to the first color filter is a light transmissive region and the other region on the first mask plate corresponding to the first and second openings of the first color filter is a light non-transmissive region; performing development on the exposed layer of first filter material; and performing a bake process to form the first color filter pattern including the first opening and the second opening.

Second, forming a layer of second filter material on the transparent substrate formed with the first color filter pattern thereon by spin coating or scraping; performing exposure on the layer of second filter material using a second mask plate, wherein a region on the second mask plate corresponding to the second color filter is a light transmissive region and the other region on the second mask plate corresponding to the first and second openings of the second color filter is a light non-transmissive region; performing development on the exposed layer of second filter material; and performing a bake process to form the second color filter pattern including the first opening and the second opening.

Third, forming a layer of third filter material on the transparent substrate formed with the second color filter pattern thereon by spin coating or scraping; performing exposure on the layer of third filter material using a third mask plate, wherein a region on the third mask plate corresponding to the third color filter is a light transmissive region and the other region on the third mask plate corresponding to the first and second openings of the third color filter is a light non-transmissive region; performing development on the exposed layer of third filter material; and performing a bake process to form the third color filter pattern including the first opening and the second opening.

For example, each of the first, second and third mask plates may be a full tone mask plate; each of the first color filter pattern, the second color filter pattern and the third color filter pattern may be any one of a red color filter, a green color filter and a blue color filter, and the correspondence between the first, second and third color filters and the red, green and blue color filters is not limited. In an actual application, the color filter layer pattern may further include a fourth color filter pattern which may be a yellow color filter pattern or an other color filter pattern, which is not limited in the present invention.

For example, the first color filter patterns, the second color filter patterns and the third color filter patterns are arranged cyclically; that is, the first, second and third color filter patterns are arranged sequentially in a color filter pattern cycle, and for example, the color filter pattern cycle includes one first color filter pattern, one second color filter pattern and one third color filter pattern.

Step 503, forming a planarization layer 106 on the transparent substrate formed with the plurality of first black matrix patterns, the plurality of second black matrix patterns and the color filter layer pattern thereon, so that thickness of the planarization layer at the first region 104 is not the same as that at the second region 105.

Generally, the planarization layer is transparent, and the principal component thereof is resin. A layer of resin may be formed on the transparent substrate formed with the color filter layer pattern thereon by spin coating or scraping, and the layer of resin is then baked so that the layer of resin is cured to form the planarization layer.

Since area of the first region 104 is not the same as that of the second region 105, when the planarization layer 106 is formed on the transparent substrate formed with the plurality of first and second black matrixes and the color filter layer pattern thereon, thickness of the planarization layer at the first region 104 is not the same as that of the planarization layer at the second region 105.

Step 504, forming a post spacer layer pattern including a first post spacer pattern and a second post spacer on the planarization layer through a single patterning process, so that the first post spacer and the second post spacer are identical in both shape and size.

First, a post spacer layer is formed on the planarization layer 106 and a principal component thereof is also resin. A layer of resin may be formed on the transparent substrate formed with the planarization layer 106 thereon by spin coating or scraping to function as the post spacer layer. Then, the post spacer layer is exposed using a full tone mask plate and developed to form the post spacer layer pattern including the first post spacer pattern and the second post spacer pattern.

The patterning process may include processes of performing exposure on the post spacer layer using the full tone mask plate and performing development on the exposed post spacer layer. In particular, the full tone mask plate consists of a light transmissive region and a light non-transmissive region, wherein the first post spacer pattern and the second post spacer pattern correspond to the light transmissive region of the first full tone mask plate, and the other region of the post spacer layer correspond to the light non-transmissive region of the full tone mask plate. Then the post spacer layer is exposed using the full tone mask plate, developed, and baked to obtain the first post spacer pattern and the second post spacer patter. Since the first post spacer pattern and the second post spacer pattern are obtained through a single patterning process, the first post spacer pattern and the second post spacer pattern are identical in both shape and size to ensure that a height difference is obtained between the first post spacer and the second post spacer when thickness of the planarization layer corresponding to the first post spacer is not the same as that of the planarization layer corresponding to the second post spacer. Compared with the existing process using the gray tone mask plate, the process of forming the first post spacer and the second post spacer simultaneously using the full tone mask plate is simpler, the production cost is lower and the yield is higher.

It should be pointed out that, all the materials of the black film layer, the first, second, and third filter layer and the post spacer layer in the embodiment of the present invention are described by taking negative photoresist as an example.

Optionally, the first opening may be triangular, semi-circular, semi-elliptical, or semi-polygonal in shape; and the second opening may be triangular, semi-circular, semi-elliptical, or semi-polygonal in shape.

Optionally, the first opening may be of a first isosceles triangle, and a bottom of the first isosceles triangle coincides with a first side of the color filter the first opening belongs to; and the second opening may be of a second isosceles triangle, and a bottom of the second isosceles triangle coincides with a second side of the color filter the second opening belongs to. Thus, since both the first opening and the second opening are symmetrical, the manufacturing process is simplified and flatness of the first region 104 and the second region 105 is ensured so that the first post spacer pattern and the second post spacer pattern may be reliably located on the first region 104 and the second region 105.

Preferably, each of the first post spacer pattern and the second post spacer pattern may be of a frustum of cone, area of a lower bottom of the first post spacer pattern which contacts the planarization layer 106 is larger than area of an upper bottom of the first post spacer pattern which is far away from the planarization layer 106, and area of a lower bottom of the second post spacer which contacts the planarization layer 106 is larger than area of an upper bottom of the second post spacer which is far away from the planarization layer 106.

In the manufacturing method of a color filter substrate provided by the embodiment of the present invention, first, forming the plurality of first black matrix patterns and the plurality of second black matrix patterns through a single patterning process; then, forming the color filter layer pattern, the color filter layer pattern includes at least the plurality of first, second and third color filter patterns, since each color filter pattern of at least a set of the first, second and third color filter patterns which are arranged adjacently includes the first opening and the second opening, areas of the first region and the second region formed by the first, second and third color filter patterns including the first and second openings are not identical, so that when the planarization layer is formed on the transparent substrate provided with the color filter layer pattern thereon, thickness of the planarization layer at the first region is not the same as that of the planarization layer at the second region, and thus when the first and second post spacer patterns are formed through a single patterning process, the first and second post spacer patterns are identical in both size and shape, and the height difference between the first post spacer pattern and the second post spacer pattern is readily achieved by the difference between thickness of the planarization layer at the first region and that of the planarization layer at the second region. Compared with the prior art, the procedure of patterning processes is simplified, the product quality is improved, cost is reduced and the production capacity is improved.

It should be understood that, the above embodiments are only used to explain the principle of the present invention and the protection scope of the present invention is not limited thereto. The person skilled in the art can make various variations and modifications without departing from the spirit and scope of the present invention, therefore, all equivalent technical solutions fall within the scope of the present invention, and the protection scope of the present invention should be defined by the claims.

The invention claimed is:

1. A color filter substrate, including a plurality of first black matrixes and a plurality of second black matrixes which are arranged to intersect, and a color filter structure; wherein the color filter structure includes at least a plurality of first color filters, a plurality of second color filters, and a plurality of third color filters, each of which extends along an extension direction of the plurality of second black matrixes and intersects with a first black matrix of the plurality of first black matrixes, and protrudes from the plurality of first black matrixes and the plurality of second black matrixes, every two adjacent color filters are separated from each other by one second black matrix of the plurality of second black matrixes, the plurality of first color filters, the plurality of second color filters, and the plurality of third color filters are arranged sequentially in a color filter cycle along an extension direction of the plurality of first black matrixes, the color filter cycle includes one first color filter, one second color filter and one third color filter;

in one color filter cycle,
each color filter is strip-shaped and extends along the second black matrix, the color filter intersects with the first black matrix and is provided with a first inward notch and a second inward notch to further expose a part of the first black matrix, and opening directions of the first inward notch and the second inward notch are opposite to each other and face towards adjacent color filters, respectively, such that a first part of the color filter at the first black matrix has a narrower width than the other part of the color filter at a region other than the first black matrix;

a region within the first black matrix, which is between first parts of the first color filter and the second color filter, is defined as a first region; a region within the first black matrix, which is between first parts of the second color filter and the third color filter, is defined as a second region, and an area of the first region is not the same as that of the second region so that within the first black matrix, a distance between the first parts of the first color filter and the second color filter along the first black matrix is not the same as that between the second color filter and the third color filter along the first black matrix;

the color filter substrate further includes a planarization layer, a first post spacers and a second post spacers, the planarization layer is located above the plurality of first black matrixes, the plurality of second black matrixes and the color filter structure such that the planarization layer directly contacts the first black matrixes at the first region and the second region, and along the first black matrix, a thickness of the planarization layer within the first region is not the same as that within the second region; and the first post spacer is located on the planarization layer within the first region, the second post spacer is located on the planarization layer within the second region, and the first post spacer and the second post spacer are identical in shape and in size.

2. The color filter substrate of claim 1, wherein the plurality of first black matrixes and the plurality of second black matrixes are arranged perpendicular to each other, the plurality of first black matrixes correspond to gate lines of an array substrate, and the plurality of second black matrixes correspond to data lines of the array substrate.

3. The color filter substrate of claim 2, wherein the first notch is triangular, semi-elliptical, or semi-polygonal in shape; and the second notch is triangular, semi-elliptical, or semi-polygonal in shape.

4. The color filter substrate of claim 3, wherein the first notch is of a first isosceles triangle, and a bottom of the first isosceles triangle coincides with a first side of the color filter which the first notch belongs to; the second notch is of a second isosceles triangle, and a bottom of the second isosceles triangle coincides with a second side of the color filter which the second notch belongs to.

5. The color filter substrate of claim 1, wherein the first notch is triangular, semi-elliptical, or semi-polygonal in shape; and the second notch is triangular, semi-elliptical, or semi-polygonal in shape.

6. The color filter substrate of claim 5, wherein the first notch is of a first isosceles triangle, and a bottom of the first isosceles triangle coincides with a first side of the color filter which the first notch belongs to; the second notch is of a second isosceles triangle, and a bottom of the second isosceles triangle coincides with a second side of the color filter which the second notch belongs to.

7. The color filter substrate of claim 1, wherein each of the first post spacer and the second post spacer is of a frustum of cone, area of a lower bottom of the first post spacer which contacts the planarization layer is larger than area of an upper bottom of the first post spacer which is far away from the planarization layer, and area of a lower bottom of the second post spacer which contacts the planarization layer is larger than area of an upper bottom of the second post spacer which is far away from the planarization layer.

8. A display device, including the color filter substrate of claim 1.

9. A manufacturing method of a color filter substrate, including steps:

forming a plurality of first black matrix patterns and a plurality of second black matrix patterns which are arranged to intersect on a transparent substrate through a single patterning process;

forming a color filter layer pattern on the transparent substrate formed with the plurality of first black matrix patterns and the plurality of second black matrix patterns thereon;

wherein the color filter layer pattern includes at least a plurality of first color filter patterns, a plurality of second color filter patterns, and a plurality of third color filter patterns, each of which extends along an extension direction of the plurality of second black matrix patterns and intersects with a first black matrix pattern of the plurality of first black matrix patterns, and protrudes from the plurality of first black matrix patterns and the plurality of second black matrix patterns, every two adjacent color filter patterns are separated from each other by one second black matrix pattern of the plurality of second black matrix patterns, the plurality of first color filter patterns, the plurality of second color filter patterns, and the plurality of third color filter patterns are arranged sequentially in a color filter pattern cycle along an extension direction of the plurality of first black matrix patterns, the color filter pattern cycle includes one first color filter pattern, one second color filter pattern and one third color filter pattern, in one color filter pattern cycle, each color filter pattern is strip-shaped and extends along the second black matrix pattern, the color filter intersects with the first black matrix pattern and is provided with a first inward notch and a second inward notch to further expose a part of the first black matrix pattern, and opening directions of the first inward notch and the second inward notch are opposite to each other and face towards adjacent color filters, respectively, such that a first part of the color filter at the first black matrix pattern has a narrower width than the other part of the color filter at a region other than the first black matrix pattern; a region within the first black matrix pattern, which is between first parts of the first color filter pattern and the second color filter pattern, is defined as a first region, a region within the first black matrix pattern, which is between first parts of the second color filter pattern and the third color filter pattern, is defined as a second region, and an area of the first region is not the same as that of the second region so that within the first black matrix pattern, a distance between the first parts of the first color filter pattern and the second color filter pattern along the first black matrix patterns is not the same as that between the second color filter pattern and the third color filter pattern along the first black matrix pattern;

forming a planarization layer on the transparent substrate formed with the plurality of first black matrix patterns, the plurality of second black matrix patterns and the color filter layer pattern thereon, so that the planarization layer directly contacts the first black matrixes at the first region and the second region, and along the first black matrix patterns, a thickness of the planarization layer within the first region is not the same as that within the second region; and forming a post spacer layer pattern including a first post spacer pattern within the first region and a second post spacer within the second region on the planarization layer through a single patterning process so that the first post spacer and the second post spacer are identical in shape and in size.

10. The manufacturing method of claim 9, wherein the step of forming a plurality of first black matrix patterns and a plurality of second black matrix patterns which are arranged to intersect on a transparent substrate through a single patterning process includes:

forming a plurality of first black matrix patterns and a plurality of second black matrix patterns which are arranged perpendicular to each other on the transparent substrate through a single patterning process, wherein the plurality of first black matrix patterns correspond to gate lines of an array substrate, and the plurality of second black matrix patterns correspond to data lines of the array substrate.

11. The manufacturing method of claim 9, wherein the step of forming a color filter layer pattern on the transparent substrate formed with the plurality of first black matrix patterns and the plurality of second black matrix patterns thereon includes:

forming a layer of first filter material on the transparent substrate formed with the plurality of first black matrix patterns and the plurality of second black matrix patterns thereon, performing exposure on the layer of first filter material using a first mask plate, and then performing development on it to form the first color filter pattern including the first notch and the second notch;

forming a layer of second filter material on the transparent substrate formed with the first color filter pattern thereon, performing exposure on the layer of second filter material using a second mask plate, and then performing development on it to form the second color filter pattern including the first notch and the second notch; and forming a layer of third filter material on the transparent substrate formed with the second color filter pattern thereon, performing exposure on the layer of third filter material using a third mask plate, and then performing development on it to form the third color filter pattern including the first notch and the second notch.

12. The manufacturing method of claim 9, wherein the step of forming a post spacer layer pattern including a first post spacer pattern and a second post spacer on the planarization layer through a single patterning process includes:

forming a post spacer layer on the planarization layer, performing exposure on the post spacer layer using a full tone mask plate, and then performing development on it to form the post spacer layer pattern including the first post spacer pattern and the second post spacer pattern.

13. A color filter substrate, comprising a plurality of first black matrixes and a plurality of second black matrixes which are arranged to intersect, and a color filter structure; wherein the color filter structure is arranged above the plurality of first black matrixes and the plurality of second black matrixes, and comprises a plurality of color filters, which extend continuously along a direction of the second black matrix, are separated from each other by the second black matrix, and intersect with the first black matrix;

each of the color filters is provided with a first recess and a second recess, which have opposite opening directions and have different shapes or sizes, at a position where the color filter intersects the first black matrix, to further expose a part of the first black matrix such that a first part of the color filter at the first black matrix has a narrower width than the other part of the color filter at a region other than the first black matrix, and the first recess of a first color filter faces the first recess of a second color filter, which is adjacent to the first color filter, to define a first region within the first black matrix, and the second recess of the second color filter faces the second recess of a third color filter, which is not the first color filter and adjacent to the second color filter, to define a second region within the first black matrix, and an area of the first region is different from that of the second region.

14. The color filter substrate of claim 13, further comprising a planarization layer, a first post spacer and a second post spacer, the planarization layer is located above the plurality of first black matrixes, the plurality of second black matrixes and the color filter structure such that the planarization layer directly contacts the first black matrixes at the first region and the second region, and along the first black matrix, a thickness of the planarization layer within the first region is different from that within the second region; and the first post spacer is located on the planarization layer within the first region, the second post spacer is located on the planarization layer within the second region, and the first post spacer and the second post spacer are identical in shape and in size.

15. The color filter substrate of claim 13, wherein the plurality of first black matrixes and the plurality of second black matrixes are arranged perpendicular to each other.

16. The color filter substrate of claim 13, wherein the first recess is triangular, semi-elliptical, or semi-polygonal in shape; and the second recess is triangular, semi-elliptical, or semi-polygonal in shape.

17. The color filter substrate of claim 15, wherein the first recess is of a first isosceles triangle, and a bottom of the first isosceles triangle coincides with a first side of the color filter which the first recess belongs to; the second recess is of a second isosceles triangle, and a bottom of the second isosceles triangle coincides with a second side of the color filter which the second recess belongs to.

18. The color filter substrate of claim 13, wherein each of the first post spacer and the second post spacer is of a frustum of cone, an area of a lower bottom of the first post spacer which contacts the planarization layer is larger than an area of an upper bottom of the first post spacer which is away from the planarization layer, and an area of a lower bottom of the second post spacer which contacts the planarization layer is larger than an area of an upper bottom of the second post spacer which is away from the planarization layer.

* * * * *